Nov. 12, 1963 — B. STERNLICHT — 3,110,828
DYNAMOELECTRIC MACHINE PROVIDED WITH GAS LUBRICATED BEARINGS
Filed June 27, 1961 — 2 Sheets-Sheet 1
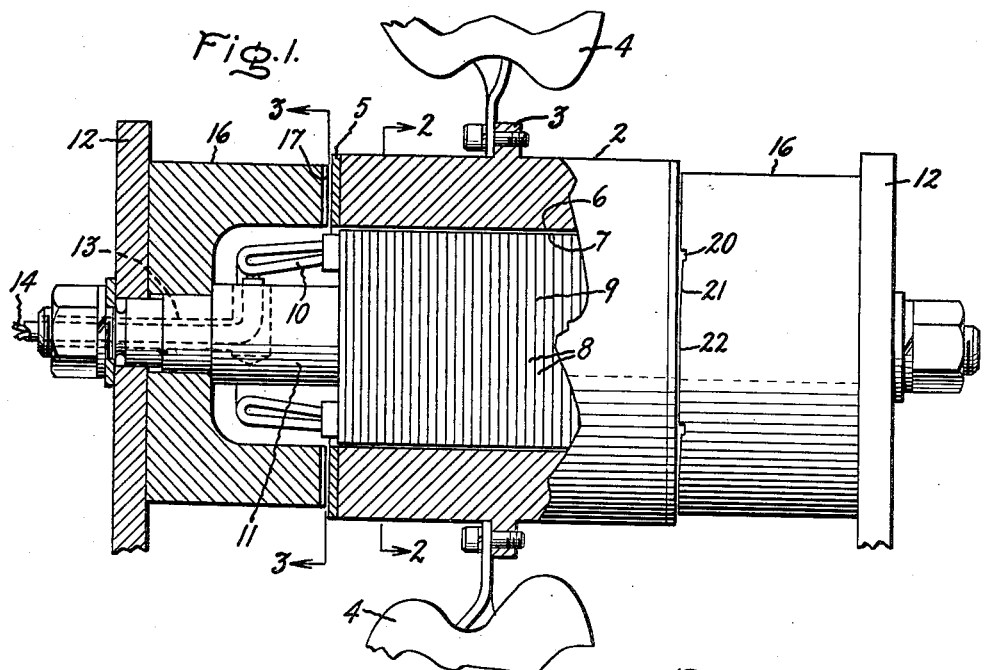
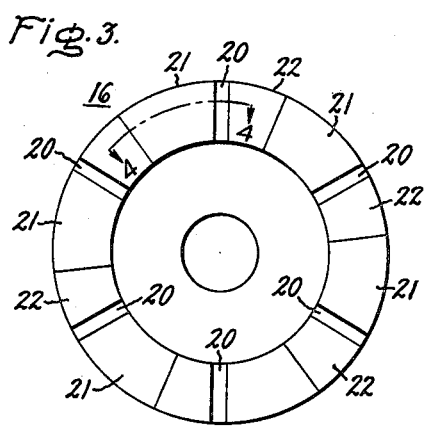
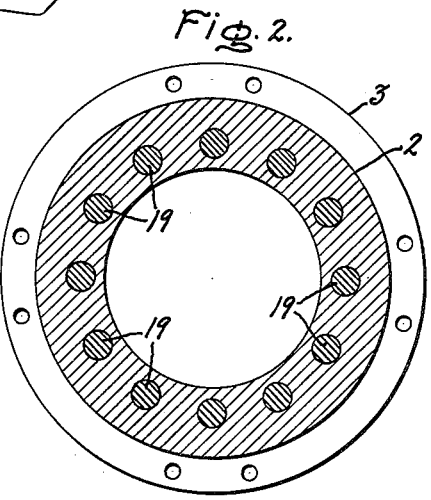
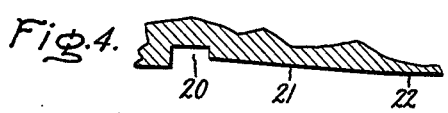
Inventor:
Beno Sternlicht,
by Paul A. Frank
His Attorney.

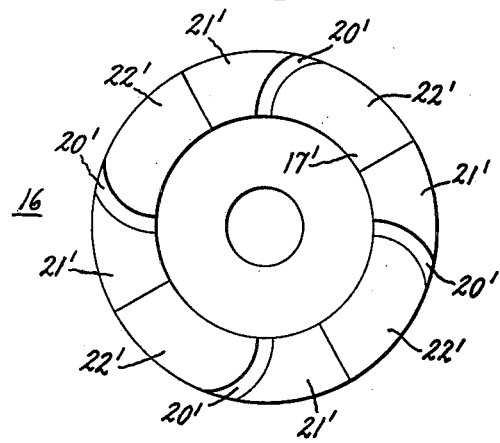
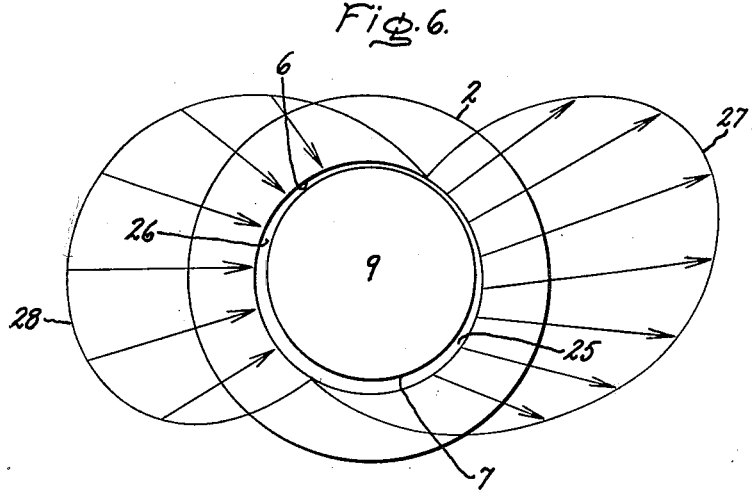

United States Patent Office 3,110,828
Patented Nov. 12, 1963

3,110,828
DYNAMOELECTRIC MACHINE PROVIDED WITH GAS LUBRICATED BEARINGS
Beno Sternlicht, Schenectady, N.Y., assignor to General Electric Company, a corporation of New York
Filed June 27, 1961, Ser. No. 120,039
5 Claims. (Cl. 310—67)

The present invention relates to dynamoelectric machines and, more particularly, to electric motor driven fans.

The physical size and shape of an electric motor driven apparatus is often determined by the cumulative functions supplied by various elements of the apparatus. In the usual induction motor driven fan, for example, the length of the apparatus is to a large degree determined by the functions associated with the rotor. Generally, the rotor has the following functions incorporated therein: the electromotive function for actuating the device, bearings for rotatably supporting the rotor, and coupling means for attaching the vanes or other air moving means. The electromotive portion of the apparatus is determined in terms of size by factors such as running and starting requirements. This consideration further suggests the size and character of the bearings and also the amount of lubricant reservoir space required to supply lubricant to the bearings.

During designing, these factors are considered and reconciled with competitive considerations to determine the nature of the final commercial apparatus. For example, because of market considerations, the size of the electromotive portion of the apparatus may be modified and boundary lubrication may be resorted to in the bearings despite the undesirable aspects of rubbing contact in a bearing construction. These compromises result in a reduced life span for the apparatus, and further, in the possibility of a less satisfactory apparatus because of increased noise, vibration, and wear.

The chief object of the present invention is to provide an improved dynamoelectric machine.

An object of the invention is to provide an improved compact motor driven fan.

A further object of the invention is to provide a dynamoelectric machine having improved bearing means.

Another object of the invention is to provide an improved dynamoelectric machine having gas lubricated bearings located in the magnetic gap of the machine.

A still further object of the invention is to provide an improved dynamoelectric machine having a rotor which envelops the stator, and further having bearing means located in the magnetic gap between the rotor and the stator.

These and other objects of my invention may be more readily perceived from the following description.

One of the features of the present invention is an improved fan which has air or gas propelling vanes mounted on a rotor which envelops the stator. Gas lubricated bearings may be located in the magnetic gap between the stator and the rotor and atmospheric air may be supplied to the bearings in the magnetic gap through suitable grooves provided in thrust bearings located adjacent the ends of the rotor.

The attached drawings illustrate preferred embodiments of the invention, in which:

FIGURE 1 is a sectional view of a motor driven fan employing the present invention;

FIGURE 2 is a sectional view taken through line 2—2 in FIGURE 1 showing the rotor construction employed in the apparatus.

FIGURE 3 is a sectional view of the apparatus shown in FIGURE 1 taken through line 3—3 showing the surface configuration of the thrust bearing utilized in the apparatus in FIGURE 1;

FIGURE 4 is an enlarged sectional view of a portion of the thrust bearing shown in FIGURE 3 taken through line 4—4;

FIGURE 5 is a view of another embodiment of a thrust bearing for use in the apparatus in FIGURE 1; and FIGURE 6 is a diagrammatic view showing the hydrodynamic forces generated in the magnetic gap of the apparatus shown in FIGURE 1.

In FIGURE 1 there is shown an induction motor which may comprise a rotor which envelops a stator having air bearing means on the magnetic gap therebetween for supporting said rotor. Rotor 2 may comprise a substantially cylindrical member having an annular flange 3 for mounting, by bolt means or otherwise, vanes 4 for propelling air or other gaseous medium. On each end of rotor 2 may be located suitable planar thrust journal surfaces 5 and cylindrical member 2 may include an inner cylindrical journal surface 6 adapted to engage the bearing surface 7 of stator 9 in a manner more fully described hereinafter. Stator 9 may include a laminated portion 8 having suitable windings 10 and in view of the need for a magnetic gap between journal 6 and bearing 7, the stator may be suitably coated with a non-magnetic material such as a silicone plastic impregnated with graphite to provide lubricating qualities for use in a manner more fully described hereinafter. Laminated portion 8 of stator 9 may be mounted on a stationary shaft portion 11 extending from each end thereof which may be connected to stationary vertical supports 12. On one side of shaft 11 there may be furnished a passage 13 to permit electrical connections 14 to pass therethrough to permit the supply of electrical power to windings 10.

In the present embodiment, stator 9 has associated therewith thrust bearing members 16 on each side of rotor 2 to support reactive forces generated by vanes 4 propelling air or other gaseous medium. Each of said thrust bearing constructions may be supported on stationary shaft 11 and have bearing surfaces 17 adapted to coact with journal surfaces 5 on the ends of rotor 2. The nature of thrust bearing surfaces 17 is more fully described hereinafter.

In FIGURE 2 there is shown a sectional view taken through line 2—2 in FIGURE 1 which shows rotor 2 as comprising a cylindrical shape member having an inner cylindrical opening which defines journal surface 6. The outer periphery of rotor 2 may be provided with flange 3 having suitable bolt holes therein for supporting a plurality of air propelling vanes 4. In this construction, the rotor may be fabricated of solid ferrous material and may have located adjacent and concentric with the opening defined by the journal surface 6 a plurality of rotor bars 19 fabricated of a material such as copper or aluminum. These rotor bars 19 are annularly disposed parallel to the axis of the rotor. The nature and operation of this type of induction motor is conventional and well known in the art.

In FIGURE 3 there is shown a sectional view of the apparatus shown in FIGURE 1 taken through line 3—3 to illustrate the nature of the thrust bearing 16. Thrust bearing 16 includes thrust surface 17 having a plurality of radially extending grooves 20. These grooves and adjacent portions may be better seen in FIGURE 4 which is a sectional view taken through the bearing construction shown in FIGURE 3 through line 4—4. Moving in the direction of rotor rotation, adjacent groove 20 there is located a surface 21 inclined with respect to planar journal surface 5. Planar surface 21 lies adjacent surface 22 and is parallel to journal surface 5, surface 22 terminating in the next groove 20.

In FIGURES 5 there is shown another embodiment of thrust member 16 wherein thrust surface 17' includes a plurality of arcuate grooves 20' which extend in a direction whereby the friction effect of rotating surface 5 urges air through said grooves. Adjacent grooves 20' are inclined surfaces 21' constructed similar to surfaces 21 in FIGURE 4 and similarly, there are planar portions 22' similar to surfaces 22 in FIGURE 4. In this embodiment, the lubricating air to the bearing 6 is supplied at an elevated pressure as determined by the pumping effort of this construction.

In the operation of the apparatus shown in FIGURE 1, the induction motor is started and functions electrically in the manner of a conventional motor of this type. Initially, the rotor 2 is supported on the upper surface of bearing 7 in stator 9 and because of the plastic material coated on the stator there is maintained the desired magnetic or air gap between the rotor and the stator plus desirable low friction surface contact to permit relative movement of the surfaces. As the rotor begins to turn, hydrodynamic fluid pressure is generated between the rotor and the stator in the air gap and the rotor assumes the eccentric position shown in FIGURE 6. In the converging area 25 (FIGURE 6) between bearing surface 7 and journal surface 6, the rotation of the rotor generates a positive pressure shown by curve 27. Since diverging area 26 is an expanding space between the rotor and stator, there is generated a negative pressure shown by curve 28. The character of these pressure curves is well known in the bearing art.

In the disclosed embodiment of the invention, air is supplied between the journal surface 6 and bearing surface 7 by being drawn from the atmosphere through grooves 20 in the thrust bearing shown in FIGURES 3 and 4 and grooves 20' in the bearing shown in FIGURE 5, the air being drawn into the space between the journal and the bearing by the negative pressure generated as shown by curve 28. The rotor is then supported by positive air pressure which is hydrodynamically generated. In the present embodiment thrust bearing surfaces 17 also utilize air as a lubricant. As a result of the inclined portions 21 and 21' there is created hydrodynamic wedges of air between the thrust bearings and journal surfaces. In this manner, the rotor is supported hydrodynamically at the ends and in the magnetic gap which effectively floats the rotor.

The present invention presents a compact dynamoelectric machine having bearings in the magnetic gap. Space is conserved by utilizing air lubricated bearings obviating the use of a lubricant reservoir in the device. Furthermore, the air is supplied without auxiliary pumping means but is hydrodynamically induced into the magnetic gap. The described embodiment discloses a construction which is both compact and highly effective for fan constructions, and is assured of long life because of the unique bearing construction and the novel means with which lubricant is supplied to the bearing surfaces.

While I have described preferred embodiments of my invention, it will be understood that my invention is not limited thereto since it may be otherwise embodied within the scope of the appended claims.

What I claim as new and desire to secure by Letters Patent of the United States is:

1. In a dynamoelectric machine, the combination of a stator, a rotor inductively associated with said stator, said rotor substantially enveloping said stator and defining a magnetic gap therebetween, said stator including bearing means, said rotor including journal means operatively associated in said magnetic gap with said bearing means, thrust bearing means adapted to engage the end of said rotor and having grooves extending through the inner and outer peripheries of said thrust bearing means, and passage means located adjacent said thrust bearing means for supplying gaseous lubricant from the atmosphere to the bearing means by means of hydrodynamic wedges of gaseous lubricant being generated between the thrust bearing means and the end of the rotor.

2. In a dynamoelectric machine, the combination of a stator, a rotor inductively associated with said stator, said rotor substantially enveloping said stator and defining a magnetic gap therebetween, said stator including bearing means, said rotor including journal means operatively associated in said magnetic gap with said bearing means, a thrust bearing adapted to engage the end of said rotor, said thrust bearing having inclined portions and groove means extending through the inner and outer peripheries of said thrust bearing means and adapted to generate hydrodynamic wedges of gaseous lubricant and to place the magnetic gap in communication with the atmosphere to supply gaseous lubricant from the atmosphere to the bearing means.

3. The dynamoelectric machine according to claim 2 in which the groove means comprise a plurality of radially extending grooves extending through the bearing surface of the thrust bearing means.

4. The dynamoelectric machine according to claim 2 in which the groove means comprise a plurality of arcuate grooves in the thrust bearing surface of the bearing means for placing the bearing means in communication with the atmosphere.

5. In a dynamoelectric machine, the combination of a stator having windings, said stator having an outer cylindrical surface with a non-magnetic coating, said coated surface comprising a bearing surface, a rotor inductively associated with said stator, said rotor having an inner cylindrical surface defining a journal surface to engage the bearing surface of said stator, said rotor substantially enveloping said stator and defining a magnetic gap therebetween, said stator further having planar journal surfaces located on each end thereof, thrust bearing means associated with planar journal surfaces, said thrust bearing means including surfaces having a plurality of radially extending grooves extending through the inner and outer peripheries of said thrust bearing means and inclined portions for placing the bearing surface located in said magnetic gap in communication with the atmosphere whereby gaseous lubricant from the atmosphere passes through the said groove and provides lubricant for said bearing surface.

References Cited in the file of this patent

UNITED STATES PATENTS

| | | |
|---|---|---|
| 2,362,667 | Schmidt | Nov. 1, 1944 |
| 2,427,947 | Koch | Sept. 23, 1947 |
| 2,495,895 | Hervert | Jan. 31, 1950 |
| 2,713,970 | Kueser | July 26, 1955 |
| 2,802,957 | Gievers | Aug. 13, 1957 |
| 2,854,188 | Shomphe | Sept. 30, 1958 |
| 2,889,474 | Macks | June 2, 1959 |
| 2,916,642 | Macks | Dec. 8, 1959 |
| 2,929,944 | Shewmon | Mar. 22, 1960 |
| 2,937,294 | Macks | May 17, 1960 |
| 2,951,634 | Koch | Sept. 6, 1960 |
| 2,983,832 | Macks | May 9, 1961 |
| 3,004,180 | Macks | Oct. 10, 1961 |
| 3,022,935 | Frost | Feb. 27, 1962 |
| 3,027,471 | Burgwin et al. | Mar. 27, 1962 |